United States Patent [19]

Jalbing et al.

[11] Patent Number: 4,619,912
[45] Date of Patent: Oct. 28, 1986

[54] CATALYTIC CONVERTER SUBSTRATE

[75] Inventors: John I. Jalbing, Millington; Richard T. Carriere, Davison, both of Mich.

[73] Assignee: General Motors Corporation, Detroit, Mich.

[21] Appl. No.: 771,777

[22] Filed: Sep. 3, 1985

[51] Int. Cl.$^4$ .............................................. B01J 35/04
[52] U.S. Cl. .................................. 502/439; 502/527; 422/180
[58] Field of Search ................ 502/439, 527; 156/205; 422/180

[56] References Cited

U.S. PATENT DOCUMENTS

| | | | |
|---|---|---|---|
| 3,770,389 | 10/1973 | Kitzner et al. | 422/174 |
| 3,785,781 | 1/1974 | Hervert et al. | 23/288 F |
| 3,966,646 | 6/1976 | Noakes et al. | 252/477 R |
| 4,098,722 | 7/1978 | Cairns et al. | 252/466 J |
| 4,186,172 | 1/1980 | Scholz | 422/180 |
| 4,300,956 | 11/1981 | Rosenberger et al. | 502/527 X |
| 4,318,888 | 3/1982 | Chapman et al. | 422/180 |
| 4,559,205 | 12/1985 | Hood | 422/180 |

Primary Examiner—W. J. Shine
Attorney, Agent, or Firm—R. L. Phillips

[57] ABSTRACT

There is disclosed a catalytic converter substrate formed of two smooth foil strips and one corrugated foil strip arranged and folded together so that alternate folds of each of the smooth foil strips have spaced sides and juxtaposed abutting sides and interleave with those of the other smooth foil strip and so that all of the folds of the corrugated foil strip have spaced sides that sandwich the folds with juxtaposed abutting sides of both the smooth foil strips so as to define passages therebetween and whereby all the strips are adapted to be retained together against telescoping by engaging retaining means at the opposite ends of all of their folds.

3 Claims, 4 Drawing Figures

CATALYTIC CONVERTER SUBSTRATE

TECHNICAL FIELD

This invention relates to catalytic converters and more particularly to those with a catalyst coated metal substrate formed of smooth and corrugated foil strips.

BACKGROUND OF THE INVENTION

In the manufacture of catalytic converters used to eliminate the undesirable constituents in combustion engine exhaust gases, it is currently common practice as an alternative to bedded ceramic beads to employ a ceramic monolith or substrate that is coated with a catalyst and contained in a sheet metal housing through which the exhaust gases are directed. The ceramic is both frangible and has a much lower coefficient of expansion than the sheet metal forming the housing and as a result, an arrangement is required that will both support and maintain sealed integrity of the ceramic monolith without fracture thereof in the harsh vibratory and temperature environment of the engine exhaust system. Moreover, the ceramic monolith is normally formed by extrusion through a die and as a result a new die is required for every cross-sectional change.

Honeycomb substrates formed of foil strips have been proposed in avoidance of such problems; however, they are typically deficient in some respect and/or present their own problems from a manufacturing and/or functional standpoint. For example, it is known to form the honeycomb substrate by spirally winding strips of smooth and corrugated foil but there results the problem of relative telescoping or sliding between the layers which abrades the catalyst. With such an arrangement, it is difficult to maintain the integrity of the metal substrate without some form of mechanical strengthening or bonding of the layers. Then there remains another major problem of allowing design flexibility in the shape of the metal layered substrate cross-section to meet various space allocations while maintaining a curved profile for housing strength reasons. This is particularly important in meeting certain vehicle underflow space requirements where a low profile cross-section of for example oval shape is desired over a circular one which requires a larger height for the same area. Moreover, there is the difficulty and expense of manufacture in completely forming a metal layered substrate so as to be suitable for a final step of applying the catalyst coating. For example, a whisker-covered metal foil has been developed that is ideally suited to retain a catalyst coating as disclosed in U.S. Pat. Nos. 4,318,828 and 4,331,631 assigned to the assignee of the present invention. However, the whiskers on such foil are metal oxide growths and as a result, form both a metallurgical and mechanical barrier preventing intimate contact between the base metal of adjacent layers of the foil and thereby their strong fusion welding which is normally necessary to form a suitable honeycomb substrate for the catalyst.

SUMMARY OF THE INVENTION

The present invention solves such problems and is a substantial departure from the conventional method of winding foil to form the substrate. According to the present invention, the substrate is constructed of two smooth foil strips and one corrugated foil strip which are arranged and folded together so that alternate folds of each of the smooth foil strips have spaced sides and juxtaposed abutting sides and interleave with those of the other smooth foil strip. On the other hand, all of the folds of the corrugated foil strip have spaced sides that sandwich the folds with juxtaposed abutting sides of both the smooth foil strips so as to define passages therebetween and whereby all the strips are adapted to be retained together against telescoping by engaging the retaining means at the opposite ends of all of their folds while being foldable so as to conform to a prescribed cross-sectional profile such as the low profile oval shape desired for underfloor vehicle use.

The thus folded foil strip substrate is retained by a sheet metal retainer preferably comprising a pair of identical shells which conjointly exactly conform about their interior to the desired substrate cross-section profile whereas the free folded height of the thus combined strips is made oversize. A substantial compressive load is thus applied to the folded strips crosswise thereof by clamping action of the retainer shells when they are forced together and affixed along abutting longitudinal edges by welding. With such joining of the retainer shells, the folded strips are thereafter positively held in the desired cross-sectional profile and are also frictionally held together against telescoping by the thus retained compressive load. Moreover, the retainer shells are provided with an inwardly projecting flange at and about their opposite ends which extends over the ends of the folds to positively prevent any longitudinal movement between the foil strips and the retainer. Thus, it will be appreciated that the above novel arrangement permits use of the afore-mentioned whisker-covered foil without requiring welding together of the foil layers and the resulting containerized preloaded whisker-covered metal substrate need only be coated with a suitable catalyst as a final step before being mounted in a suitable converter housing or otherwise adapted for use.

These and other objects, advantages and features of the present invention will become more apparent from the following description and drawing in which:

Figure 1:
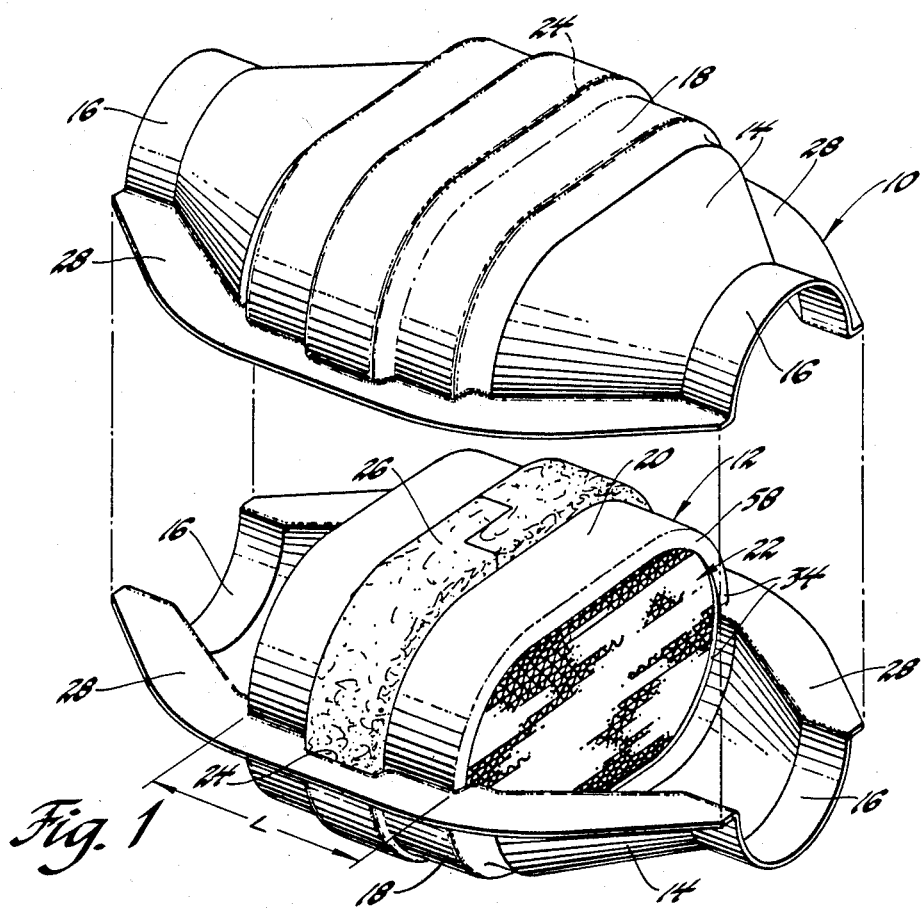
FIG. 1 is a perspective view with the top housing shell exploded away of a catalytic converter constructed according to the present invention.
Figure 2:
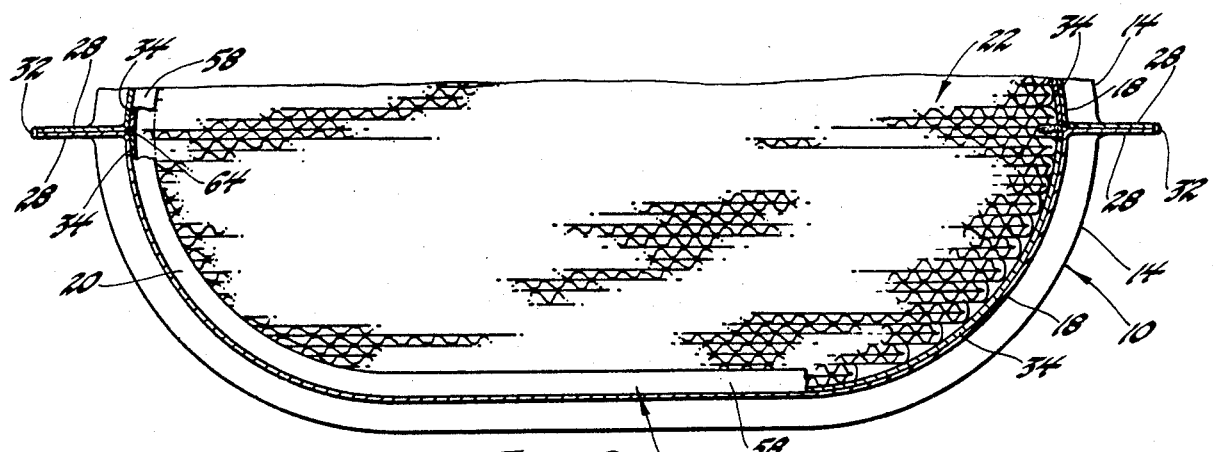
FIG. 2 is an enlarged cross-sectional view and with parts broken away of the converter in FIG. 1.

Referring to the drawing, there is shown a catalytic converter constructed according to the present invention and intended for use in eliminating the undesirable constituents in internal combustion engine exhaust gases. The catalytic converter is particularly adapted with a low profile cross-section of oval shape for underfloor installation in an automobile exhaust system and generally comprises a housing 10 enclosing a retainer and monolith assembly 12 as seen in FIGS. 1 and 2. The housing 10 comprises a pair of identical sheet metal shells 14 having semi-cylindrical end sections 16 and an intermediately located semi-oval section 18. The housing shells' semi-oval sections 18 conjointly conform to the periphery of the monolith retainer 20 of assembly 12 so as to receive same in direct contact while the semi-cylindrical end sections 16 cooperate to define cylindrical inlet and outlet openings at opposite ends of the monolith 22 of assembly 12 adapting the converter for connection in an engine's exhaust pipe system (not shown). In addition, the housing shells 14 are formed midway of their oval section 18 with an internal semi-annular groove 24 which is adapted to receive a split ring seal 26 extending about the middle of the monolith retainer. The seal 26 is made of resilient heat expandable intumescent material such as that supplied under the tradename Interam by Technical Ceramics Products Division, 3M Company. The housing shells 14 are formed along their edge on each side with an outwardly projecting flange 28 extending from one end to the other so that when the housing shells are forced together about the retainer and monolith assembly 12, these flanges mate and then may be sealingly secured to complete the converter assembly. For purposes of processing, the mating flanges 28 are initially held together by a plurality of spot welds whereafter they are permanently fixed and sealed along their entire length by an edge weld 32.

Figure 4:
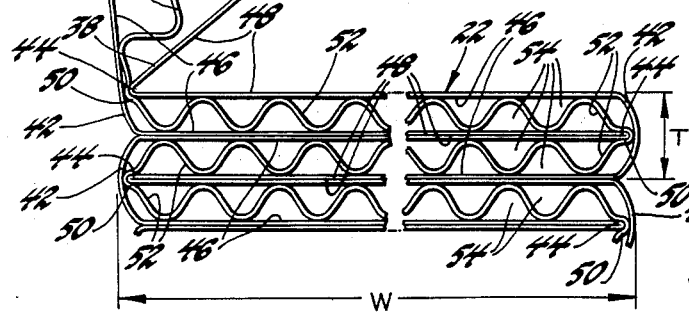
FIG. 4 is an enlarged end view showing the folding of the foil strips in the construction of the foil strip substrate in the converter in FIG. 1.

The retainer 20 comprises a pair of identical sheet metal shells 34 while the monolith or substrate 22 which is retained thereby as disclosed in more detail later, is constructed of three folded foil strips 36, 38 and 40 as best seen in FIG. 4.

Preferably, the foil used in the construction of the strips 36, 38 and 40 is whisker-covered metal foil which has been found to be ideally suited to retain a catalyst coating as disclosed in the afore-mentioned U.S. Pat. Nos. 4,318,828 and 4,331,631 assigned to the assignee of the present invention and which are hereby incorporated by reference.

The two strips 36 and 38 are plain or smooth foil and the third strip 40 is corrugated foil and these three strips are arranged and rectangularly folded together so that alternate folds 42 and 44 of each of the smooth foil strips have spaced rectangular sides 46 and juxtaposed abutting rectangular sides 48 and interleave with those of the other smooth foil strip. On the other hand, all of the folds 50 of the corrugated foil strip 40 have spaced sides 52 that sandwich the folds 44 with the juxtaposed abutting sides 48 of both the smooth foil strips so as to define passages 54 therebetween and whereby all the strips are adapted to be retained together against telescoping by engaging at the opposite ends of all of their folds with inwardly projecting flanges 58 formed on the opposite ends of the retainer shells 34. Furthermore, it will be seen that the corrugated foil strip 40 winds back and forth between the spaced sides 46 of the folds 42 of both the smooth foil strips 36 and 38 and is thus fully enveloped thereby.

Moreover, the strips are foldable so as to conform to a prescribed cross-sectional profile such as the oval shape shown which because of its low profile is desired for underfloor vehicle use.

Figure 3:
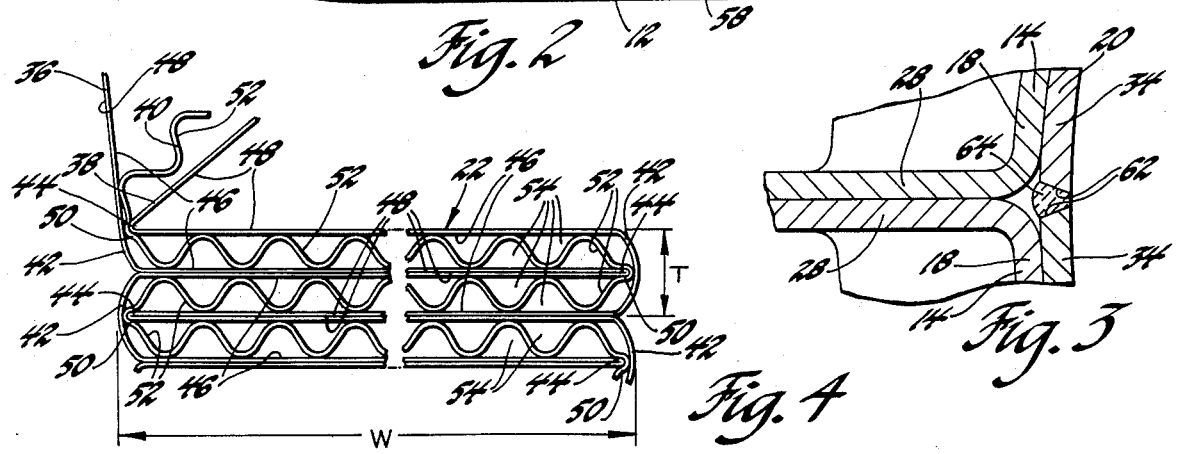
FIG. 3 is an enlarged view of the longitudinal edge construction of the substrate container in FIG. 2.

To this end, the resulting combined three-strip folds are provided with a uniform thickness (T) and length (L) but various widths (W) so as to conform to the desired oval outline or profile. The two retainer shells 34 provided for the thus folded strips conjointly exactly conform about their interior to the desired substrate cross-sectional profile whereas the free or unloaded stack height of the folded strips is made oversize so that a predetermined compressive load is applied to the folded strips crosswise thereof by clamping action of the retainer shells when they are forced to engage each other on opposite sides along mating longitudinal edges 62 which then are permanently joined by seam welds 64 as seen in FIG. 3. With such joining of the retainer shells, the folded strips are thereafter positively retained by the retainer in the desired oval shape. Moreover, the folded strips are frictionally held together against telescoping by the thus retained compressive load and also in a positive mechanical way by the retainer flanges 58 engaging the opposite ends of all of their folds 42, 44 and 50. And thus there is no need for any form of mechanical fastening or bonding together of the metal foil substrate layers such a by staples and welding.

Thus, it will be appreciated that the retainer and monolith assembly using the whisker-covered foil may be completely assembled and thereafter needs only to be coated with a suitable catalyst as a final step before being mounted in the converter housing. Moreover, while in the preferred construction shown the retainer and monolith assembly serves as a subassembly or insert that mounts in a clam shell type housing, it is also contemplated that the retainer itself could serve as the converter housing with suitable inlet and outlet sections then secured to the opposite ends thereof so as to adapt the retainer and monolith assembly for installation in an exhaust system. Furthermore, it will be appreciated while the catalytic converter shown has an oval cross-sectional profile, the present invention readily lends itself to the formation of other cross-sectional forms having a curved profile. For example, by simply varying the width (W) of the folds, it can be seen that a substrate having an irregular as well as a circular cross-sectional profile can be readily constructed.

The above described preferred embodiment is thus illustrative of the invention which may be modified within the scope of the appended claims.

The embodiments of the invention in which an exclusive property or privilege is claimed are defined as follows:

1. A catalytic converter substrate formed of folded foil strips prevented from telescoping by retaining means engaging opposite ends of their folds characterized by two smooth foil strips and one corrugated foil strip arranged and folded together so that alternate folds of each of the smooth foil strips have spaced sides and juxtaposed abutting sides and interleave with those of the other smooth foil strip and so that all of the folds of the corrugated foil strip have spaced sides that sandwich the folds with juxtaposed abutting sides of both the smooth foil strips so as to define passages therebetween and whereby all the strips are adapted to be retained together against telescoping by engaging the retaining means at the opposite ends of all of their folds.

2. A catalytic converter substrate formed of folded foil strips prevented from telescoping by retaining means engaging opposite ends of their folds characterized by two smooth foil strips and one corrugated foil strip arranged and folded together so that alternate folds of each of the smooth foil strips have spaced sides and juxtaposed abutting sides and interleave with those of the other smooth foil strip and so that the corrugated foil strip winds back and forth between the spaced sides of both the smooth foil strips and all of the folds of the corrugated foil strip have spaced sides that sandwich the folds with juxtaposed abutting sides of both the smooth foil strips so as to define passages therebetween and whereby all the strips are adapted to be retained together against telescoping by engaging the retaining means at the opposite ends of all of their folds.

3. A catalytic converter substrate formed of folded foil strips prevented from telescoping by retaining means engaging opposite ends of their folds characterized by two smooth foil strips and one corrugated foil strip arranged and folded together in varying widths so that alternate folds of each of the smooth foil strips have spaced sides and juxtaposed abutting sides and interleave with those of the other smooth foil strip and so that all of the folds of the corrugated foil strip have spaced sides that sandwich the folds with juxtaposed abutting sides of both the smooth foil strips so as to define passages therebetween and whereby all the strips are adapted to be retained together against telescoping by engaging the retaining means at the opposite ends of all of their folds and the cross-sectional profile of the substrate is determined by the variation in the widths of the folds.

* * * * *